(12) United States Patent
Meijer et al.

(10) Patent No.: US 7,730,079 B2
(45) Date of Patent: Jun. 1, 2010

(54) QUERY COMPREHENSIONS

(75) Inventors: Henricus Johannes Maria Meijer, Mercer Island, WA (US); Anders Hejlsberg, Seattle, WA (US); Paul A. Vick, Seattle, WA (US); Amanda Silver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/215,089

(22) Filed: Aug. 30, 2005

(65) Prior Publication Data

US 2007/0050347 A1     Mar. 1, 2007

(51) Int. Cl.
G06F 7/00    (2006.01)
G06F 17/30   (2006.01)

(52) U.S. Cl. .................. 707/760; 707/161; 715/968
(58) Field of Classification Search .......... 707/2, 707/3, 4, 5, 101, 104.1, 999.002, 999.003, 707/999.004, 999.005, 999.101, 999.107; 715/968

See application file for complete search history.

(56) References Cited

U.S. PATENT DOCUMENTS

| | | | |
|---|---|---|---|
| 5,694,559 A | | 12/1997 | Hobson |
| 5,778,357 A | | 7/1998 | Kolton et al. |
| 5,930,785 A | * | 7/1999 | Lohman et al. ............. 707/2 |
| 6,009,422 A | * | 12/1999 | Ciccarelli .................. 707/4 |
| 6,032,144 A | * | 2/2000 | Srivastava et al. ........... 707/3 |
| 6,092,062 A | * | 7/2000 | Lohman et al. ............. 707/2 |
| 6,205,441 B1 | * | 3/2001 | Al-omari et al. ............ 707/2 |
| 6,285,997 B1 | | 9/2001 | Carey |
| 6,341,281 B1 | * | 1/2002 | MacNicol et al. ........... 707/3 |
| 6,360,214 B1 | * | 3/2002 | Ellis et al. ................. 707/2 |
| 6,438,741 B1 | * | 8/2002 | Al-omari et al. ............ 707/2 |
| 6,618,718 B1 | | 9/2003 | Couch |
| 6,643,640 B1 | * | 11/2003 | Getchius et al. ............ 707/3 |
| 6,678,672 B1 | * | 1/2004 | Ramasamy et al. .......... 707/2 |
| 2002/0123984 A1 | | 9/2002 | Prakash |
| 2003/0144994 A1 | * | 7/2003 | Wen et al. ................. 707/3 |
| 2003/0212540 A1 | | 11/2003 | Meredith et al. |
| 2004/0254928 A1 | | 12/2004 | Vronay et al. |
| 2005/0004892 A1 | * | 1/2005 | Brundage et al. ........... 707/3 |
| 2005/0010565 A1 | | 1/2005 | Cushing |
| 2005/0015381 A1 | | 1/2005 | Clifford et al. |
| 2005/0102302 A1 | * | 5/2005 | Marr ..................... 707/101 |
| 2005/0138073 A1 | * | 6/2005 | Zhou et al. ............. 707/104.1 |
| 2005/0166140 A1 | * | 7/2005 | Cai et al. ................ 715/513 |

(Continued)

OTHER PUBLICATIONS

Josifovski et al., "Query Decomposition for a Distributed Object-Oriented Mediator System", Kluwer Academic Publishers, 2002, pp. 307-336.*

(Continued)

*Primary Examiner*—Shahid A Alam
*Assistant Examiner*—Phong Nguyen
(74) *Attorney, Agent, or Firm*—Workman Nydegger

(57) ABSTRACT

The subject disclosure pertains to interaction with one or more collections of data. Queries and domains are presented as separate entities. A number of compositional operators are provided to manipulate a generic collection of data at a low level. Query comprehensions can specify interactions with one or more collections at a higher or more intuitive level. The query comprehensions can be translated or mapped to operators that can be employed to interact with one or more data collections and return results where applicable.

16 Claims, 13 Drawing Sheets

U.S. PATENT DOCUMENTS

| | | | |
|---|---|---|---|
| 2006/0155694 A1 | 7/2006 | Chowdhuri | |
| 2006/0167865 A1* | 7/2006 | Andrei | 707/4 |
| 2006/0218123 A1* | 9/2006 | Chowdhuri et al. | 707/2 |
| 2007/0050348 A1* | 3/2007 | Aharoni et al. | 707/4 |
| 2007/0208721 A1* | 9/2007 | Zaman et al. | 707/4 |

OTHER PUBLICATIONS

Bry, "Towards an Efficient Evaluation of General Queries: Quantifier and Disjunction Processing Revisited", ACM, 1989, pp. 193-204.*

Beihong Jin. Translating Object Query Language. http://csdl2.computer.org/persagen/DLAbsToc.jsp?resourcePath=/dl/proceedings/&toc=comp/proceedings/tools/1999/0393/00/0393toc.xml&DOI=10.1109/TOOLS.1999.796509 Last accessed Aug. 30, 2005.

Leonidas Fegaras. Query Optimization Techniques for OODB Languages. http://art.cwru.edu/idm/PIReports/8.html. Last accessed Aug. 30, 2005.

Nicolas Bruno, et al. Efficient Creation of Statistics over Query Expressions. Proceedings of 19th International Conference on Data Engineering, Bangalore, India, 2003.

Torsten Grust. Comprehending Queries. In Ausgezeichnete Informatikdissertationen 1999 (Distinguished Dissertations in Computer Science), pp. 74-83, B.G. Teubner, Sep. 2000.

Andrew R. Golding and Yves Schabes, Combining Trigram-Based And Feature-Based Methods For Context-Sensitive Spelling Correction, Jun. 1996, p. 71-78.

Ant Je Helfrich, Bradley Music, Project Notes And Demos: Design And Evaluation Of Grammar Checkers In Multiple Languages, Jul. 2000, pp. 1036-1040.

Colin Wilcox, Graham Mayor And Klaus Linke, Microsoft Office Word, Word 2002 Help And How To, Section "Add Power To Word Searches With Regular Expression", Date: Oct. 27, 2009.

Office Action dated Oct. 16, 2007 cited in U.S. Appl. No. 11/215,142.

Office Action dated Apr. 8, 2008 cited in U.S. Appl. No. 11/215,142.

* cited by examiner

QUERY COMPREHENSIONS

CROSS-REFERENCE TO RELATED APPLICATIONS

This application is related to U.S. patent application Ser. No. 11/170,545, filed Aug. 30, 2005, and entitled "PROGRAMMATIC QUERY ASSISTANCE".

BACKGROUND

A database is a collection of data or facts organized in a systematic manner and persisted to a storage device by a database management system. The data can be structured according to a variety of methods or models. For example, a hierarchical data model associates each piece of knowledge with a record and places the records in a tree data structure such that each record is owned by only one entity. An extension of the hierarchical model is the network model that arranges the records in a graph data structure allowing for a record to have multiple parents and children. A database can also be represented using a simple flat-file model. In such a model, the information is stored in a plain text file with one record per line. At present, XML is a popular format for storing data or text hierarchically. However, the most common model employed today is still the relational database model wherein mathematical relations based on set theory and predicate logic represent the data.

The organized nature of database data enables computer programs to retrieve answers to questions easily and efficiently. In particular, computer programs can create, manipulate and retrieve data from a database utilizing a query. For a relational database management system, the query can be formatted utilizing the structured query language (SQL). For example, to extract the complete customer records for all customers with the last name "Smith," the SQL query expression could be formatted like SELECT*FROM customers WHERE lastname='Smith'. In this example, the keyword SELECT indicates the query is a retrieval query, the keyword FROM specifies which table of the database the data is to be found, in this case customers, and the keyword WHERE designates that only the rows with columns matching the given parameters should be returned.

In the event that XML is utilized to store data hierarchically, a different query language is employed to interact with XML. XML Path Language (XPath) is a language recommended by the World Wide Web Consortium (W3C) for addressing portions of an XML document. In XPath, the previous SQL example would be formatted as xmlDoc.selectNodes("//customer[lastname=Smith]"). In this example, the query returns all customer element nodes that have a lastname child node with the value "Smith." The W3C is presently developing a language called XQuery that is built on XPath. XQuery is designed to query XML data to retrieve and manipulate data from XML documents or a data source capable of being viewed as XML data.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, query systems and methodologies are disclosed herein. In accordance with one aspect of the disclosure, query comprehensions are provided. Query comprehensions provide a concise and compositional mechanism for specification of queries. Query comprehensions are data format or shape agnostic and therefore are able to be employed over one or more arbitrary collections. Query comprehensions can be translated or mapped to more primitive operators that can interact with collections of various types. Queries are thus separated from domains. Accordingly, a single query could be utilized to retrieve relational data as well as XML, for example.

In accordance with another aspect of the subject innovation, abbreviations can be utilized. Abbreviations are shorthand notation for more complex query comprehensions. To evaluate an abbreviation, the abbreviation is first eliminated by translation to a corresponding expanded comprehension. The comprehension can then be mapped to one or more sequence operators, which can be utilized to interact with collections.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
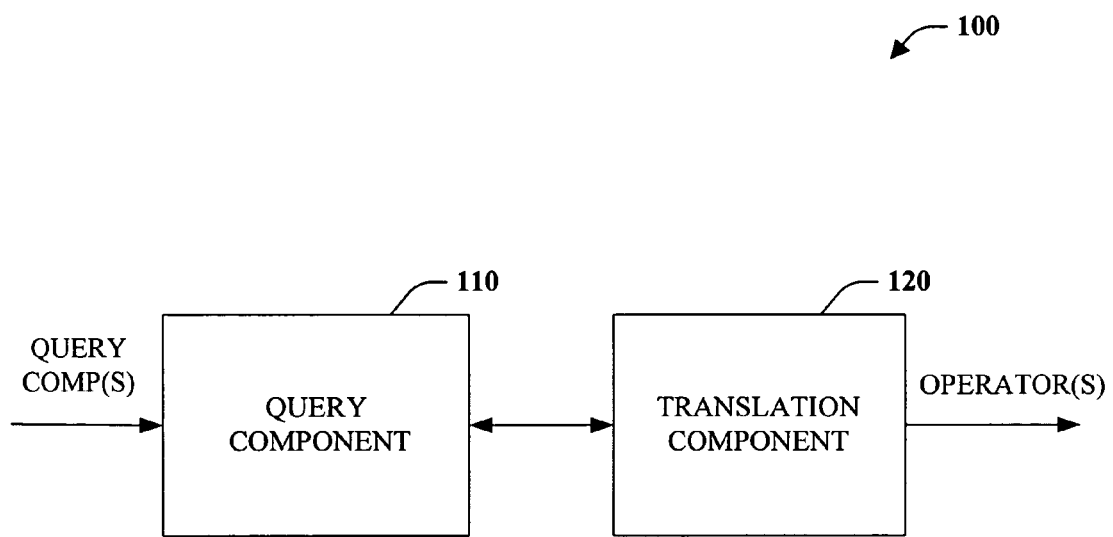
FIG. 1 is a block diagram of query system that translates query comprehensions.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, various exemplary code snippets are provided throughout in various programming languages executable by various architectures. It should be appreciated that these examples are provided for purposes of clarity and understanding and are not meant to limit the scope of the disclosed subject matter to the languages or architectures provided.

As used herein, the term "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, jump drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, a query system 100 is depicted in accordance with an aspect of the disclosed subject matter. Query system 100 includes a query component 110 and a translation component 120. Query component 110 can receive, retrieve or otherwise acquire or obtain one or more query comprehensions. A query comprehension is a concise and compositional expression of a query. In particular, query comprehensions are easy to comprehend by understanding each sub-expression in isolation. Compositionality produces a language that is easy to comprehend and ensures that the semantics and typing rules of the language can be defined clearly. In addition, query comprehensions are language or data format agnostic. Hence, queries are separated or independent of a domain. Query component 110 is communicatively coupled to translation component 120. Translation component 120 obtains a query comprehension from the query component 110 and translates, transforms or maps the query comprehension to one or more primitive operators, among other things.

Operators such as sequence operators interact with one or more data collections. A data collection can embody a generalized collection or monoid. A collection can be, but is not limited to being, a mathematical collection such as lists (e.g., ordered . . . ), sets, bags and an operational collection including arrays, enumerables, enumerators, cursorables, and cursors. Sequence operators can provide monad operations on collections including but not limited to filtering, mapping, transforming, accumulation, and folding. For example, operators can facilitate filtering by analyzing a collection and throwing out values that do not satisfy a predicate. Additionally or alternatively, operators can perform some transformation on every element or sum all values in a collection. In one particular aspect of the innovation, a fixed set of operators can be employed to provide base or primitive operations on collections. Stated differently, the sequence operators provide the low-level building blocks upon which query comprehensions can be built. A high-level syntax can be utilized to define a query comprehension that translates into one or more query operators. This means that the underlying operators are bound to whatever sequence operators are in scope. This implies that by importing a particular implementation the query syntax can effectively be rebound by a user, for instance. In particular, query comprehensions can be rebound to a sequence operator implementation that attempts to distribute the execution of the query over several data sources.

By way of example and not limitation, a query comprehension can be specified that looks like SQL (structured query language) or has a SQL style format and is translated by translation component 120 into one or more query operators or an expression including query operators. In this instance, the query would not be restricted to operations on relational data as is the convention. Rather, the query could operate over relational tables, objects, XML (Extensible Mark-up Language) as well as other data formats and/or shapes. The query comprehension is independent of or divorced from a data domain. The query can operate over arbitrary collections.

Figure 2:
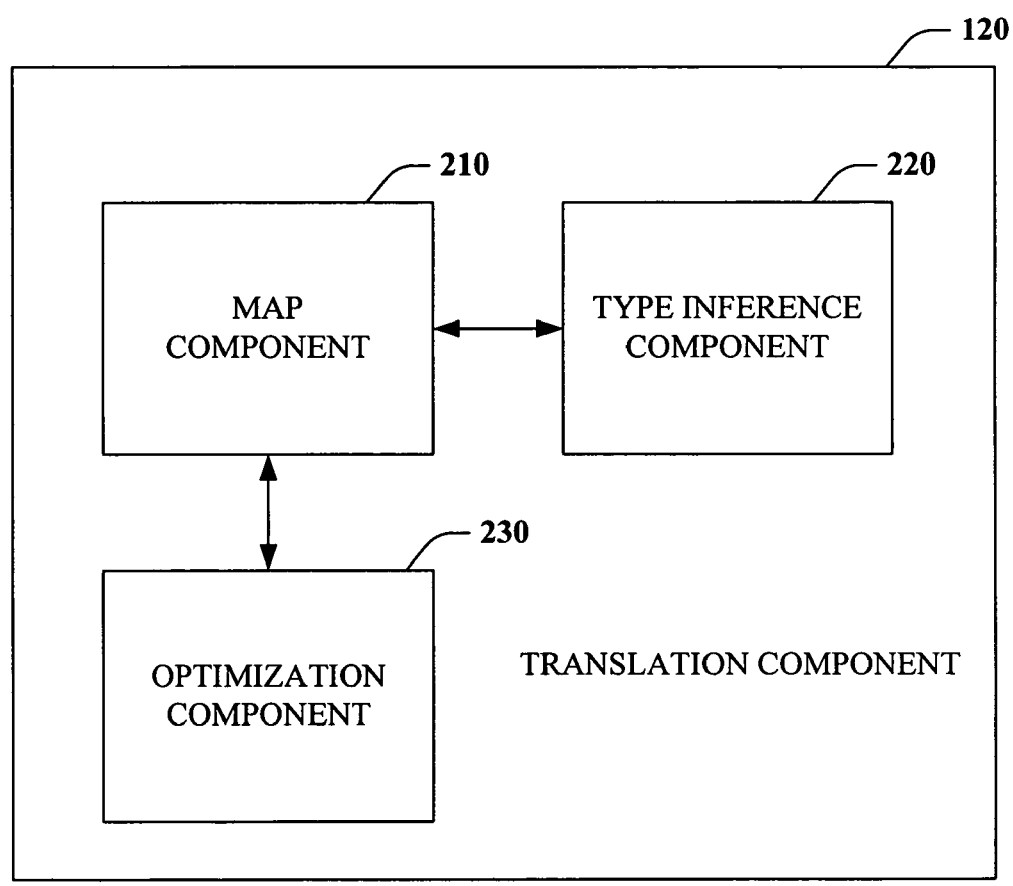
FIG. 2 is a block diagram of a translation component.

Turning to FIG. 2, a query translation component 120 is illustrated in accordance with an aspect of the subject innovation. Translation component 120 is operable to translate a query comprehension into an expression specified with operators. As a result, the query comprehension can be specified very concisely at a high level and translated to a more expansive and primitive expression that represents the semantics of the query comprehension. Query translation component 120 can include a map component 210, a type inference component 220, and an optimization component 230. The map component 210 can include and or interact with a map that identifies operators that correspond to query comprehensions or elements thereof. In addition, some or all types may not be explicitly denoted by a query comprehension for purposes of precise and/or concise expression. Accordingly, type inference component 220 can be employed to infer one or more types associated with a translated query comprehension. Types can be inferred based on context including but not limited to the semantics and/or syntax of the query comprehension and corresponding operators. Optimization component 230 can also be employed by the translation component 120 to facilitate generation of a translated query comprehension that is optimal in terms of execution. For instance, optimization component 230 can interact with map component 210. Where different operators can be employed to capture the semantics of the query comprehension, operators can be selected that optimize execution. Furthermore, it should be appreciated that optimization component 230 could also reorganize, group, ungroup, or otherwise manipulate an operator expression produced by translation component 120 to produce the best possible expression for execution.

The discussion that follows provides a few exemplary cases to facilitate clarity and understanding with respect to aspects of the subject innovation. Consider the following types that model companies, customers, and orders:
Class Company
    Name As String
    Employees As Set(Of Employees)
    Customers As Set(Of Customer)
End Class
Class Customer
    Name As String
    Orders As List(Of Order)
End Class
Class Order
    Product As String
    Price As Integer
End Class
Class Employee
    Name As String
    Birthday As DateTime
    Position As String
    Salary As Decimal
End Class
Dim Employees As Set(Of Employee)
Dim Customers As Set(Of Customer)

In this example, query comprehension will be specified in a form similar to SQL but which is not SQL. The basic "Select . . . From . . . Where" expression selects from a collection that satisfies a given condition. The example below returns all employees whose salary exceeds $200,000.

```
Dim HighRollers As Bag(Of Employee) =
    Select E From E As Employee In Employees Where
    E.Salary > 200,000
```

Type inference mechanisms allow the omission of types. Here, the type declaration in the "From" clause as well as the type of the variable to which the result is assigned can be omitted. The statement can be rewritten as:

```
Dim HighRollers = Select E From E in Employees Where
    E.Salary > 200,000
```

The query semantics are defined by translating into more primitive operators. In this example, a completely mechanical and un-optimized translation will be employed for clarity of explanation. The actual implementation, of course, can be more efficient as long as the semantics are maintained. In the translation, the notation "Function ( . . . , Argument As Type), . . . ) Expression" for anonymous methods is utilized and it is assumed that the compiler or components thereof can understand extension methods. In the continuing example, the query comprehension can be translated to:

```
Dim HighRollers = _
    Employees.Select(Function(E As Employee) New{E})._
        Where(Function(It As {E As Employee}) It.E.Salary > 200,000))._
        Select(Function(It As {E As Employee}) It.E))
```

Type inference will allow the omission of type declarations for the arguments of anonymous functions. The keyword function can also be omitted. Under these conventions, the translation of the query becomes:

```
Dim HighRollers = Employees.Select((E) {E}).Where((It) It.E.Salary >
    200,000).Select((It) It.E)
```

It should also be appreciated that by giving the iteration variable an explicit type when drawing from an untyped collection, the elements of a collection can be accessed in a strongly typed way. For example:

```
Dim UnTypedEmployees As IEnumerable = Employees
Dim Pay = Select E.Salary From E As Employees in UnTypedEmployees
Where E.Position = "SDE"
```

Without the type declaration, the type of "E" is inferred to be Object and hence all member access on E is late bound.

It should also be noted that when the "From" clause includes only one source collection, the generic translation could be simplified and with the omission of an intermediate tuple. Hence, an optimized translation could be:
Dim HighRollers=Employees.Where((E) E.Salary>200,000)

In another example, a query is specified that returns the collection of distinct salaries for all software design engineers.

```
Dim Pay As Set(Of Decimal) = Select Distinct E.Salary From E in
    Employees Where E.Position = "SDE"
```

The translation of this query to sequence operators becomes, assuming type inference:

```
Dim Pay = _
    Employees.Select((E) {E})._
        Where((It) It.E.Position = "SDE")._
        Select((It) It.E.Salary)._
        Distinct( )
```

The next example selects employees that have the same name as customer:

```
Dim Duplicates = Select E From E In Employees, C In Customers Where
E.Name = C.Name
```

The expressive power, and hence the value, of query comprehension is proportional to the thickness of the translation into sequence operators. In this case using query comprehensions saves the programmer from introducing additional names:

```
Dim Duplicates = _
    Employees.SelectMany((E).Customers.Select((C) {E, C})). _
        Where((It) It.E.Name = It.C.Name). _
        Select((It) It.E)
```

In yet another example, all items that Paul Vick has purchased are returned. Note the variable "C" is in scope in the quantification over "O:"
Dim Items=Select O.Product From C In Customers, O In C.Orders Where C.Name="Vick"

The translation to sequence operators is similar to that of the previous query comprehension:

```
Dim Items = _
    Customers.SelectMany((C) C.Orders.Select((O) {C,O})). _
        Where((It) It.C.Name = "Vick"). _
        Select((It) It.O.Product)
```

Inside a translated query, the identifier "It" is bound to the current "row," for instance. Members of "It" are automatically in scope. The notion of "It" corresponds to a context item, for example as provided in XQuery. Besides "It," depending on the type of the underlying collection and if the corresponding overload is available as a sequence operator, there my also be a special variable "Position" in scope, that is bound to the position of "It" within the collection of items currently being processed. For example:

```
Dim X = Select String.Format("{0}: {1}", Position, It) From C In
Customers
```

This is translated into a sequence operator overload that provides the position information:

```
Dim X = Customers.Select((C) {C}.Select((It, Position)
    String.Format("{0}: {1}", Position, It))
```

In fact, all previous queries are already in abbreviated form. Consider the following:
Select E From E As Employee in Employees Where E.Salary>200,000

The full form can be translated to:
Select It.E From E As Employee In Employees Where It.E.Salary>200,000

The effect of "select*from . . . " can be obtained by selecting "It" as in:
Dim R as IEnumerable(Of{E As Employee, O As Order})=Select It From E in Employees, O in E.Orders
Thus far, all example queries have returned a single result. A row is also just a single value with multiple fields. The following query projects the name, position, and salary of each employee:
Dim E As IEnumerable({Name As String, Position As String, Salary As String})=_Select {E.Name, E.Position, E.Salary} From E In Employees Further, the "{ }" can be omitted as syntactic. Hence, the above query can be written as:
Dim E=Select E.Name, E.Position, E.Salary From E In Employees Both queries translate in the sequence operator expression as follows:

```
Dim E = Employess.Select((E {E}).Select(It) {It.E.Name, It.E.Position,
It.E.Salary})
```

It should be appreciated that query comprehensions need not return flat results. The next query returns a nested result that contains the name, age, and salary of software design engineers older than forty-two:

```
Dim X as Bag(Of {Employee As {Name As String, Age As Integer},
Salary As Decimal} = Select {Employee = {E.Name,
E.Age}, E.Salary} From E in Employees_
    Where E.Position = "SDE" AndAlso E.Age > 42
```

The translation into sequence operators would be:

```
Dim X = _
    Employees.Select((E) {E})._
        Where(It) It.E.Position = "SDE" AndAlso It.E.Age <42)._
        Select ((It) {Employee = {It.E.Name, It.E.Age}, It.E.Salary})
```

As per SQL, people do not always give names to columns in the result, but still want to use that column for sorting. To support such a scenario, anonymous types should support indexing and be allowed to contain unlabeled members. For example, consider the next query comprehension:

```
Dim Xs As Bag(Of {Name As Sting, Decimal}) =_
    Select E.Name, E.Salary + 500 From E In Employees
        Where E.Position = "SDE" _Order By 1
```

This comprehension translated into sequence operators becomes:

```
Dim Xs As Bag (Of {Name As String, Decimal}) =_
    Employees.Select ((E) {E})._
        Where((It) It.E.Position = "SDE"))._
        Select((It){E.Name, E.Salary + 500})
        OrderBy((It) It(1))
```

Aggregate operators such as Min, Max, Count, Avg, Sum, and the like operate on collections and "reduce" their argument collection to a single value. The aggregate function Count for instance has type signature "Shared Count <T>(< [Me]>Src As IEnumerable(Of T)) As Integer" when defined as an extension method. By way of example, the number of programmers can be counted using the following query:

```
Dim N As Integer = Count(Select E From E In Employees Where
    E.Position = "SDE")
```

Like SQL, the system provides for a syntax for aggregates that is not compositional, but extremely convenient for "Tupling" multiple aggregate operations. For example, to count the number of employees and compute their average salary in one swoop, one can write:

```
Dim R As { Total As Integer, AverageSalary As Double } =_
    Select Total = Count(E), AverageSalary = Avg(E.Salary) From E In
Employees Where E.Position = "SDE"
```

This form is shorthand for applying a generated composite aggregate function over the result of the normal result-set without any aggregation:

```
Dim R As { Total As Integer, AverageSalary As Double } =_
    CompositeAggregate(_
        Select Total = E, AverageSalary = E.Salary From E In Employees
Where E.Position = "SDE")
```

With respect to aggregation over a subset of columns, the values of the non-aggregated columns can be implicitly aggregated into table, and the overall results of the query is a signal row that contains this tables along with the results of the explicit aggregations. For example:

```
Dim R As { Bag(Of { Name As String, Age As Integer }) ,
AverageSalary As Double } = _
    Select E.Name, E.Age, AverageSalary = Avg(E.Salary) From E In
    Employees
Where E.Position = "SDE"
```

The table does not have a label in the result row, but can be indexed by position as R(0).

Query comprehensions can also employ transitive access. Many of the sequence operator aggregates take an additional delegates parameter. For example, "Orders.Sum((O) O.Price) is shorthand for "Orders.Select((O)O.Price).Sum( )." Without a lambda expression, a programmer is forced in Visual Basic to write a much longer nested select "Select Sum(O.Price) From O In Orders." Using transitive member access once can write "Sum(Orders..Price)" or "Orders..Price.

Sum( )." The single dot "." retrieves the price of a single order, whereas the double dot ".." obtains the price of a collection of orders.

Quantifiers can be employed within query comprehensions. The existential quantifier "Some I In Items Satisfies P(I)" is an aggregate function that returns "False" when no element "I" in the collection "Items" satisfies the predicate "P(I)." This implies that when the "Items" collection is empty, the result is "False." Dually, the universal quantifier "Every I In Items Satisfies P(I)" returns "False" if there is an element "I" in the collection of "Items" that does not satisfy the predicate "P(I)." This implies that when the "Items" collection is empty, the result is "True." Consider the following exemplary query that selects the names of all customers that have ordered wine:

```
Dim Connaisseurs As Bag(Of String) = _
    Select C.Name _
    From C In Customers _
    Where Some O In C.Orders Satisfies O.Product = "Wine"
```

As an example of universal quantification employment, companies are queried where all employees, if any, are programmers:

```
Dim HighTech As Bag(Of String) = _
    Select C.Name _
    From C In Companies _
    Where Every E In C.Employees Satisfies E.Position = "SDE"
```

The translation of the existential (and similarly of the universal) quantifier can use an anonymous function for the predicate to pass the standard "Exists" extension method:

```
Dim Connaisseurs As Bag(Of String) = _
    Select C.Name _
    From C In Customers _
    Where C.Orders.Exists((O) O.Product = "Wine").
```

Aggregate functions are often utilized in combination with grouping. In this section, the long form is specified, but these queries can be specified much more concisely using abbreviated forms defined later. The next query groups all employees into partitions where each employees has the same salary and then returns each distinct salary with the number of employees earning that salary:

```
Dim Salaries As Bag(Of {Salary As Decimal, Number As Integer}) = _
Select Salary, Number = Count(Select G.E From G In
EmployeesBySalary) _
From E In Employees _
Group EmployeesBySalary By E.Salary
```

This query can be shortened or otherwise abbreviated using transitive member access as follows:

```
Dim Salaries As Bag(Of {Salary As Decimal, Number As Integer}) = _
   Select Salary, Number = Count(Group..E) _
   From E In Employees _
   Group By E.Salary
```

The "rows" returned by the "Group By" clause in query such as "Select . . . From . . . , X As T In Xs, . . . Group By . . . , Y As S=F( . . . , X, . . . ), . . . ," more specifically the type of It that is in scope in the "Select" is the same or isomorphic to "{ . . . , Y As S, . . . , Group=Bag(Of { . . . , X As T, . . . })}." The translation of a query involving grouping into the "GroupBy" sequence operator is straight forward, but tedious:

```
Dim Salaries As Bag(Of {Salary As Decimal, Number As Integer}) = _
   Employees.Select((E) {E}). _
      GroupBy((It) {It.E.Salary}). _
         Select((It) { It.Key.Salary, Number =
            It.Group.Select((G) G.E).Count( ) }
```

It is possible to filter out partitions using the "Having" clause. The following query groups all employees by position, removes all partitions where the salary is at most $100,000 and returns a collection of pairs of positions and the number of positions in that category:

```
Dim ExpensivePositions As _
   Bag(Of {Position As String, Number As Integer }) = _
      Select Position, Number = Count(Group..E) _
      From E In Employees _
      Group By E.Position _
      Having Min(Group..E.Salary) > 100.000
```

The translation into sequence operators implements "Having" by "Where" on the collection returned by "GroupBy:"

```
Dim ExpensivePositions = _
   Employees.Select((E) {E}). _
      GroupBy((It) {It.E.Position}). _
         Where((It) It.Group.Select((G)G.E.Salary).Min() > 100.000). _
            Select((It) { It.Key.Position _
               Number = It.Group.Select((G) G.E).Count()})
```

It is also possible to pre-select the Group-s formed by a Group By comprehension. For instance, in the first query:

```
Select Salary, Number = Count(Group..E) _
From E In Employees _
Group By E.Salary
```

Only the Salary is used to compute the final result but none of the values in the employee. In that case, just the Position of each employee can be selected such that the required number can be counted, for example.

```
Select Salary, Number = Count(Group..Position) _
From E In Employees _
Group E.Position By E.Salary
```

The results of queries can be sorted using the "Order By" clause. The following query sorts all employees by their name and then by descending age as the tie-breaker. Sort conditions can be followed by the modifier "Asc" or "Desc" that specifies the sorting order. The default sorting order can be either ascending or descending. In the following examples, ascending will be assumed to be the default. Consider the following:

```
Dim EmployeesByNameAndAge As List(Of Employee) = _
   Select E _
   From E In Employees _
   Order By E.Name, E.Age Desc
```

The "Order By" clause can be translated into the "OrderBy" sequence operator:

```
Dim EmployeesByNameAndAge As List(Of Employee) = _
   Employees.Select((E) {E}). _
      Select((It) It.E). _
         OrderBy((It) It.E.Name).ThenBy((It) It.E.Age)
```

The following query sorts all customers that have bought at least two items by the total value of their orders and then by their name:

```
Dim CustomersByValue As List({ Name As String, Total As
   Decimal }) = _
   Select C.Name, Total = Sum(C.Orders..Price) _
   From C In Customers _
   Where Count(C.Orders) > 2 _
   Order By Total, C.Name
```

In one conventional language (e.g., OQL) the "Order By" clause can only refer to variables bound in the "From" or else the "Group By" clause but not those in the final "Select." That is one reason why the above queries have repetition. In another conventional language (e.g., SQL) one can refer to variables bound in the "Select" as well as those bound in the "From" clause. The variables in the "Select" and "From" clause typically are not disjoint, for example "Select E From E in Employees." For comprehensions, for purpose of the "Order By" clause, the variables returned in the result row hide the variables introduce in the "From" clause. Hence, a query such as "Select X=X.A From X is Xs Order By X" would be the same as "Select X=Y.A From Y in Xs Order By X" since the "X" in the "From" clause is hidden by the "Order By" clause. In other words, the "It" in scope in the "Order By" has all the members of the result row (to facilitate access by correct position) and then all the (still visible) members of the "From" clause flattened into the row.

The "Order By" clause can refer to members bound in the "From" clause or in a comprehension involving grouping the members in the "Group By" clause, as well as the members in the final Select list. Consider for example:

```
    Dim Ages = _
      Select Age = DateTime.Now - E.BirthDay
      From E In Employees
      Order By E.Name, Age
```

The translation into sequence operators first creates a row containing the result columns and the columns from the "From" clause that are still in scope, sorts the resulting collection, and then projects out the final row from Employees:

```
    Select((E) {E}). _
      Select((It) { Age = DateTime.Now - It.E.BirthDay, It.E }). _
        OrderBy((It) It.E.Name).ThenBy((It) It.Age). _
          Select((It) {It.Age})
```

This and other examples begin to illustrate some of the intrinsic expressive power of query comprehensions.

Query system 100 of FIG. 1 has been designed, among other things, to allow query expressions to be arbitrarily composed as query comprehensions. Such compositionality enables queries to be understood by understanding each individual sub-expression. This is contrary to conventional query languages and systems including but not limited to SQL.

The SQL language and supporting system(s) are not compositional. Rather, SQL is an ad-hoc design with many special cases. It is not possible to understand a complex SQL query by understanding the individual pieces. One of the reasons that SQL lacks compositionality is that the underlying flat relational data model of SQL is itself not compositional, for instance, all tables must be flat. As a result, instead of breaking up complex expressions into smaller units as described herein, SQL programmers are forced to write a monolithic expression whose result fits in the SQL data model. A more serious negative consequence of the flat relational model is that it does not naturally generalize to deal with other forms of data such as XML and objects.

The subject innovation provides for and interacts with a query language based on the notion of monoids and monoid comprehensions. Monoids embody generalized collections and can include (both strongly and late bound) mathematical collections such as lists, sets, bags, operational collections such as arrays, enumerables, enumerators, cursorables, and cursors. Where the type system is fully compositional, there are no restrictions on what types can appear as components of other types. As a result, rows, objects, XML, active directory files, registry entries and the like are all first class citizens.

The subject innovation can support special cases and thereby maintain the spirit of such languages as SQL by providing for abbreviations. Abbreviations can make query comprehensions more concise, albeit less compositional. The semantics of such abbreviation can be defined by translation into the fully compositional explicit form.

Figure 3:
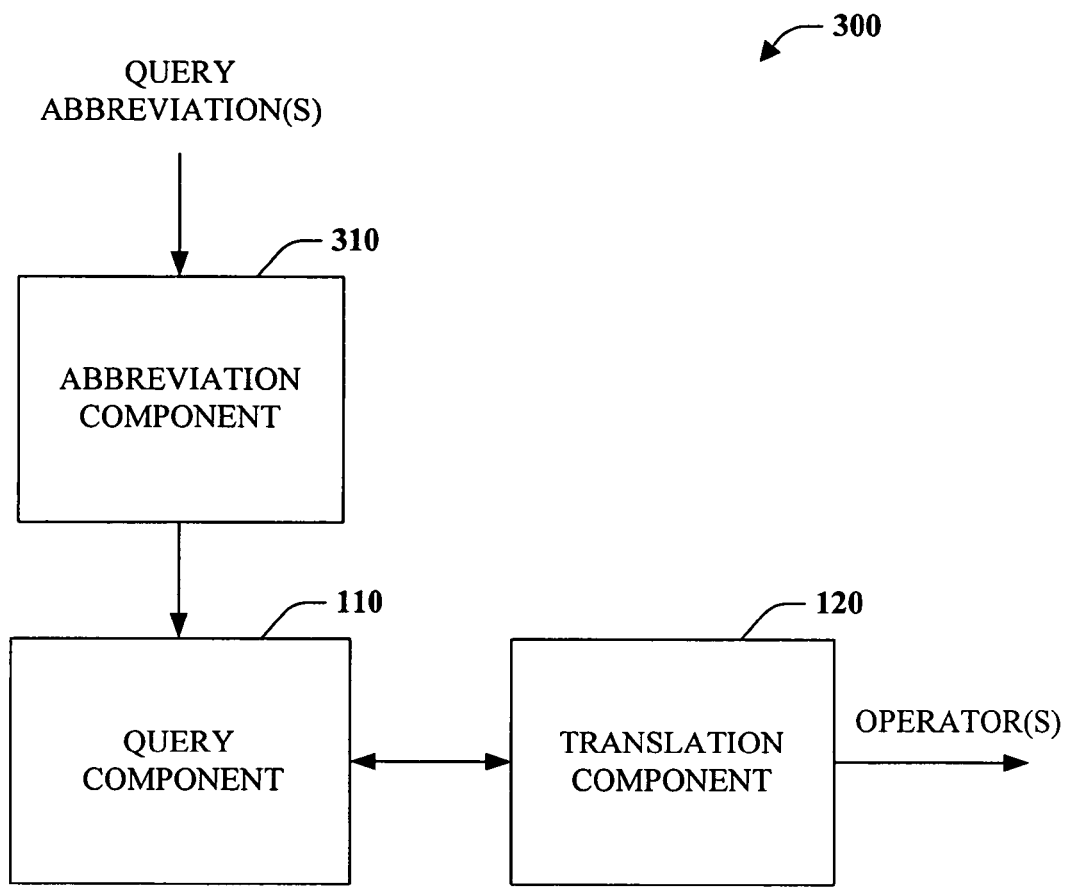
FIG. 3 is a block diagram of a query system that interacts with query abbreviations.

FIG. 3 illustrates a query system 300 in accordance with an aspect of the disclosed innovation. Query system 300 includes a query component 110, a translation component 120 and an abbreviation component 310. Query component 110 is operable to receive, retrieve, or otherwise obtain or acquire a query comprehension. A query comprehension can be a simplified and compositional query expression that is independent of any particular type or shape of data. Query component 110 is communicatively coupled to translation component 120. Query comprehensions can be provided to the translation component 120 from the query component 110, for example as data packet or plurality of data packets. Upon receipt of a query comprehension, translation component can translate or map the expression denoted by the query comprehension to an expression based on operators. Operators including but not limited to sequence operators are primitive methods that interaction with collections. Accordingly, a programmer is able to denote more abstractly and at a higher level the query or data interaction via a comprehension and have it translated into the primitive components that interact with collections.

Abbreviation component 310 can receive, retrieve, or otherwise obtain or acquire abbreviations. Query abbreviations can be employed as an additional level of abstraction for particular situations or scenarios. In other words, abbreviations can abbreviate or provide shorthand for specification of particular query comprehensions. Upon receipt or retrieval of an abbreviation, abbreviation component 310 can translate the abbreviation to a query comprehension. For example, this could be implemented such that abbreviation consults a map, among other things, to facilitate translation. Accordingly, system 300 can receive a query abbreviation and translate or map that abbreviation to a query comprehension. That query comprehension can then be translated or mapped to one or more operators that can interact with and manipulate collections of data.

Abbreviations can be beneficial in a variety of specific scenarios including but not limited to iteration, ordering, flattening, aggregation and grouping, let binding, composite predicates, query fragments and joins. As per iteration variables, when the "From" clause draws from only one source, there is no need to give a name to the iteration variable. Consider the following query:

```
    Dim Pay As Set(Of Decimal) = _
      Select Distinct E.Salary_
      From E in Employees_
      Where E.Position = "SDE"
```

This query comprehension can be abbreviated as follows:

```
    Dim Pay As Set(Of Decimal) = _
      Select Distinct Salary_
      From Employees_
      Where Position = "SDE"
```

Note that the original query comprehension already abbreviates or shortens the implicit iteration variable "It:"

```
    Dim Pay As Set(Of Decimal) =
      Select Distinct It.E.Salary_
      From E in Employees_
      Where It.E.Position = "SDE"
```

Even when drawing from multiple sources in the "From" clause, it is sometimes possible to figure out the binding of members used in the query. For example, by heavily applying name-binding heuristics, the following query:

```
Dim Items = _
    Select O.Product_
    From C In Customers, O in C.Orders_
    Where C.Name = "Vick"
```

Can be abbreviated as:

```
Dim Items =_
    Select Product_
    From Customers, Orders_
    Where Name = "Vick"
```

It is also possible to use the source name as the iteration variable so that a query can be specified as:

```
Dim Pay As Set(Of Decimal) =_
    Select Employees.Salary_
    From Employees_
    Where Employees.Position = "SDE"
```

This would abbreviate a query comprehension that employs a system-generated name:

```
Dim Pay As Set(Of Decimal) =_
    Select Distinct XX.Salary_
    From XX In Employees_
    Where XX.Position = "SDE"
```

However, this may be a little awkward because it confuses the collection and hence the type of the collection with the current element, and consequently the element type of the collection. Consider the following class:

```
Class Strange
    Implements IEnumerable(Of Employee)
    Dim Salary As Decimal
    ...
End Class
Dim Employees As Strange = ...
```

In the query above that uses Employees as the iteration variable as well as the source it is unclear what Employees.Salary means. In particular, languages such as SQL, this ambiguity probably does not emerge since tables themselves have no properties. An interesting thing is that in SQL the normal case is to use the table names as the iteration variable and they introduce the notion of iteration variable under the impressive name of "correlation name" that serves as "an alias for table names." In SQL, the "As" syntax names the iteration variable. That is, instead of writing:
Select E.Salary From E As Employee In Employees One could write:
Select E.Salary From Employees As E This abbreviation can be is rather subtle. Not only does this clash with the "Identifer As TypeName" syntax for iteration variables, but also in Visual Basic, the keyword "As" is always followed by a New TypeName( . . . ), a TypeName, or custom attributes followed by a TypeName.

Abbreviations can also be utilized with respect to flattening nested collections. There can be two operators for selection, such as "Select" and "SelectMany," where the latter is employed to flatten a nested result collection. As an example, the "Orders" member of "Customer" can be a collection of type "Set(Of Order)." Hence, selecting the orders of a collection of customers would result in a nested collection of orders. To obtain a single collection of all the orders of all the customers, one could write:

Dim O As Set(Of Order)=Customers.SelectMany((C) C.Orders)

Using the "Select" syntax the following query is much more verbose since it requires explicit flattening:

Dim O Set(Of Order)=Select O from C In Customers, O in C.Orders

Collection-valued members are abundant in languages such as XML and types that result from object/relational mappings of one-to-many relationships. Thus, it is important to provide a concise syntax for the common operation of traversing a collection-valued member for all elements in a collection. Neither the sequence operator syntax nor the comprehension syntax are brief enough and require the introduction of unnecessary names. Instead, the double-dot ".." operator can be employed as an abbreviation. Continuing with the above example, the abbreviation could be specified as:

Dim O As Set(Of Orders)=Customers..Orders

Generally speaking, "Xs..M( . . . , A, . . . ) can thus be a shorthand for Xs.SelectMany(X) X.M( . . . , A, . . . )).

Abbreviations can also be employed with respect to aggregates and groupings. Queries involving aggregates and groupings are rather verbose since they need to drill into the "Group" field of the partition. The following query returns each unique salary and the number of employees when the minimum age of the employees with that salary is at least forty-two years old.

```
Dim Salaries = _
    Select Salary, Number = Count(Group..E) _
    From E In Employees _
    Group By E.Salary
    Having Min(Group..E.Age) > 42
```

However, the type of the "Group" is known from the "From" clause. Hence, inside "Having," "Order By" and "Select" omission of both "It" and "Group" is allowed, and aggregates over members of "Group" are interpreted as tupling over the whole group. Using this abbreviation, one can denote the above query as follows:

```
Dim Salaries = _
    Select Salary, Number = Count(E) _
    From E In Employees _
    Group By E.Salary _
    Having Min(E.Age) > 42
```

This is definitely shorter than the corresponding query using sequence operators:

```
Dim Salaries = _
    Employees.Select((E) {E}). _
        GroupBy((It) { It.E.Salary }). _
            Where((It) It.Group.Select((G) G.E.Age).Min() > 42). _
            Select((It) { It.Key.Salary, _
                Number = It.Group.Select((G) G.E).Count( )})
```

More examples of the power of abbreviations relative to groupings will be provided infra in a section discussing XML.

Another form of abbreviation supported by the subject innovation is a let binding. A let binding allows one to compute a value and use it multiple times such as through an assignment. Consider the following let binding inside the "From" clause where "Total" is computed and utilized again by the "Order By" clause:

```
Dim CustomersByValue As List({ Name As String, Total As
        Decimal }) = _
    Select C.Name, Total
    From C In Customers, Total = Sum(C.Orders..Price) _
    Where Count(C.Orders) > 2 _
    Order By Total
```

Another situation where a let binding is helpful is when there is a need to compute a value of a query only once. In the following query, the value of "Review.Bonus(E)" could change over time, so it should be computed once and the resulting value used throughout the remainder of the query. For example:

```
Dim HighFlyers = _
    Select E.Name, E.Position, Pay
    From E In Employees, Pay = E.Salary + Review.Bonus(E)
    Where Pay > 200,000 _
    Order By Pay
```

In this instance, Pay is computed and utilized again in the "Where" clause and "Order By" clause.

Abbreviations can also consist of composite predicates including but not limited to "Any" and "Some." For instance, composite predicates in SQL such as X Ⓧ Any Xs and X Ⓧ Some Xs can be defined as Xs.Any((A X Ⓧ A) and Xs.Some ((A) X Ⓧ A), respectively.

Abbreviations can further enable the specification of query fragments. It is not always necessary to write "complete" queries. For example, "Xs OrderBy Salary Asc, Age Dec" can be an abbreviation for "Select It From Xs OrderBy Salary Asc, Age Desc." Similarly, "Xs Where Price>100" can be an abbreviation for "Select It From Xs Where Price>100."

Joins can also be abbreviated. Since arbitrary nesting is allowed, all the different kinds of joins can be expressed directly using normal Cartesian product. However, different forms of joins can be represented as abbreviations. Inner joins in SQL correspond directly to Cartesian products with a filter:
Select O.Date From C In Customers, O In Orders Where C.CustomerID=O.CustomerID Natural joins can be an abbreviation for inner joins where you can omit the join condition when there is a join on columns that have the same name. For instance the following is an abbreviation for the query above:

Select O.Date From C In Customers Natural Join O In Orders

As per joins over selected columns, this is a variant of natural joins where the shared columns are specified on which to join. This query can be abbreviated:
Select O.Date From C In Customers Join O In Orders Using (CustomerID)

The above is an abbreviation for the more length specification:
Select O.Date From C In Customers Join O In Orders _
Where C.CustomerID=O.CustomerID A join using a join condition is an inner join that users "On" instead of "Where." For instance:
Select O.Date From C In Customers Join O In Orders On C.CustomerID=O.CustomerID Using sequence operators, the join condition can be moved directly on the appropriate generator as well if that is desired:
Select O.Date From C In Customers, O In Orders.Where((O) C.CustomerID=O.CustomerID)

Outer joins are used to traverse relationships: Left Outer Join to navigate a one-to-many relationship, Right Outer Join to navigate a many-to-one relationship, and Full Outer Join to navigate a many-to-many relationship. It should be noted that because SQL cannot return a nested result, it is forced to return a flat table that fills rows with nulls when the many side of the relationship is empty. That means that instead of writing a simple nested query to select all customers with the products of all their orders such as:

```
Select C.Name, Orders = (Select O.Product From O In Orders Where
        O.CustID =
        C.CustID) _
    From C In Customers
```

One as the write:

```
Select C.Name, O.Product
    From C In Customers Left Outer Join O In Orders _
    Where O.CustID = C.CustID
```

With nesting, however, there is no need to have left or right outer joins. A left outer join in the one-to-many direction corresponds to a nested select, in the many-to-one direction it is the same as an inner join. Dually, a right outer join from the many-to-one direction corresponds to a nested select and in the one-to-many direction is the same as an inner join. A full outer join corresponds to navigating a many-to-many relationship. Employing nesting, one would essentially construct a link table of pairs of collections that have a common key.

It should be appreciated that aspects of this disclosure including but not limited to abbreviations can be applicable to many data types or formats. To highlight this feature further, the following example is provided to illustrate employment with respect to XML. Consider the following exemplary query that selects all books from Addison-Wesley that are published since 1991:

```
Dim Books = XDocument.Load("c:\\northwind\\bib.xml")
Dim AW = <bib>
    <%=
    Select <book <%= Book.year %>><%= Book.Title %></book>
    From Book In Books.bib.book
    Where Book.publisher = "Addison-Wesley" AndAlso Book.year
        > 1991
    %>
</bib>
```

Now consider the same query using sequence operators:

```
var bib = XDocument.Load("c:\\northwind\\bib.xml");
var AW = new XElement("bib",
    bib.Element("bib").Elements("book").
    Where(|b| (string)b.Element("publisher") =="Addison-Wesley"
        && (int)b.Attribute("year") > 1991).
    Select(|b|
        new XElement("book",b.Attribute("year"),
            b.Elements("title")
        )
    )
);
```

For each author in the bibliography, list the author's name and titles of all books by that author, grouped inside a "result" element. The next query leverages the abbreviations allowed for grouping:

```
Dim x = 
    Select <result><%= Author %><%= Book.Title %></result> _
    From Book In Books.bib.book, Author In Book.author _
    GroupBy Author OrderBy Author _

```

The translation into sequence operators would be:

```
var x = new XElement("results",
    foreach (
        b in Books.Element("bib").Elements("book"),
        a in b.Elements("author")
    ).
    GroupBy(|x| x.a).
    OrderBy(|g| g.Key.Value).
    Select(|g|
        new XElement("result",
            g.Key,
            g.Group.Select(|x| x.b.Element("title"))
        )
    )
);
```

It is also interesting to note that although XQuery is designed specifically as an XML query language, the XQuery version is the most complicated and verbose since it requires a programmer to encode the grouping:

```
{
    let $a := doc("http://bstore1.example.com/bib/bib.xml")//author
    for $last in distinct-values($a/last),
        $first in distinct-values($a[last=$last]/first)
    order by $last, $first
    return
        <result>
            <author>
                <last>{ $last }</last>
                <first>{ $first }</first>
            </author>{
                for $b in doc("http://bstore1.example.com/bib.xml")/bib/book
                where some $ba in $b/
                    satisfies ($ba/last = $last and $ba/first=$first)
                return $b/title
            }</result>
}
```

The preceding set of examples is not comprehensive. Query comprehensions and abbreviations can be employed in a plurality of other instances, for example in recursive queries, pivot and unpivot, and transaction blocks.

Figure 4:
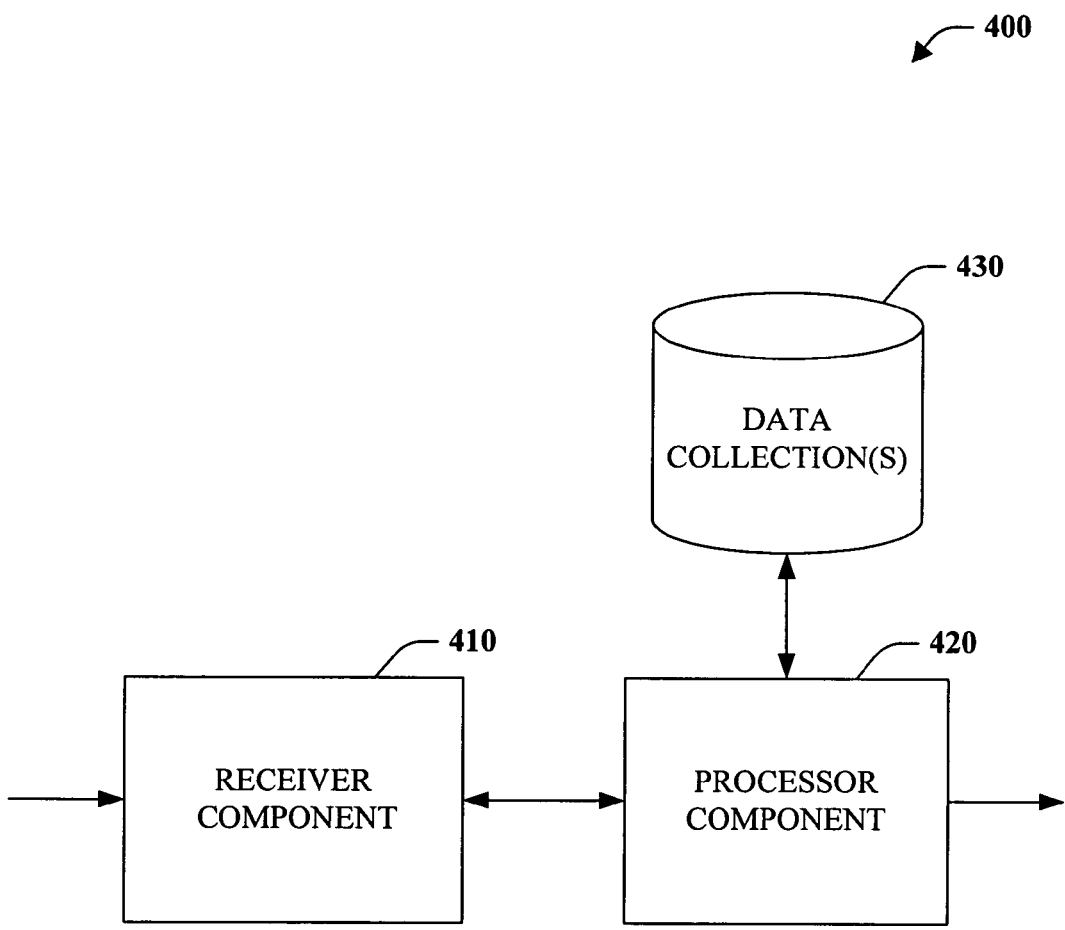
FIG. 4 is a block diagram of query evaluation system.

Turning to FIG. 4, a query evaluation system 400 is illustrated. System 400 includes a receiver component 410, a processor component 420 and a data collection(s) 430. In accordance with one aspect of the disclosed subject matter, query evaluation system 400 can form part of a compiler as described in further detail below. Receiver component 410 receives, retrieves or otherwise obtains or acquires query comprehensions, abbreviated query comprehensions, or sequence operators. Receiver component 410 is communicatively coupled to processor component 420. Processor component 420 is communicatively coupled to data collection(s) 430 and is able to interact with collection(s) 430. Upon receipt of a query comprehension, abbreviation abbreviation thereof or sequence operators, the processor component 420 can evaluate a query as specified with respect to one or more data collections 430 and return results where applicable. In the case, where the received input is a query comprehension the processor component can translate the comprehension into sequence operators which can then be executed with respect to one or more data collections 430. If the received query is, or includes, an abbreviated query comprehension or an abbreviation, the abbreviation can be translated into a query comprehension, which can subsequently be translated to one or more sequence operators that are executable with respect to one or more data collections 430. Translation between query comprehensions and sequence operators and/or abbreviations and query comprehensions can be performed as described supra with respect to FIGS. 1-3 or substantially similar thereto.

Figure 5:
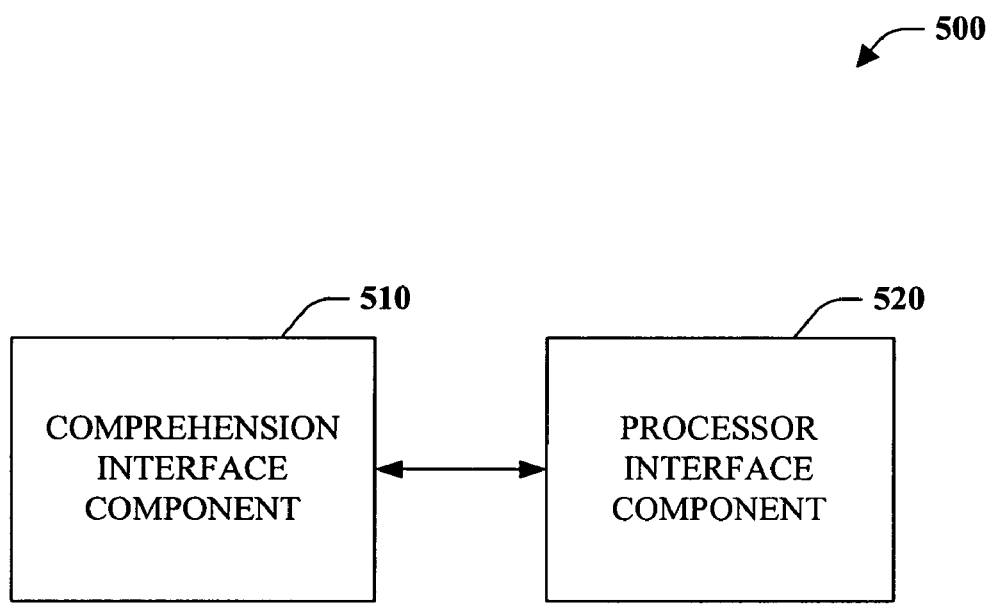
FIG. 5 is a block diagram of an interface system to facilitate query evaluation.

FIG. 5 is a block diagram of an interface system 500 to facilitate query evaluation. Interface system 500 facilitates query evaluation by enabling communication between a query comprehension or system for specification and a processing system that can evaluate the query as specified and return results where appropriate. Accordingly, system 500 can correspond to one or more application programming interfaces (APIs), among other things. Interface system 500 includes a comprehension interface component 510 and a processor interface component 520. Comprehension interface 510 is communicatively coupled to processor interface 520. By way of example and not limitation, processor interface 520 may expose some methods that can be called by the comprehension component 510, and/or vice versa. Comprehension interface component 510 receives a query comprehension and/or abbreviation thereof and is operable to transmit the receive query to processor interface 520. Processor component 520 receives, retrieves or otherwise obtains a representation of a query from comprehension interface 510.

Upon receipt, the query can be executed one or more collections of data, and where applicable, results can be transmitted from the processor interface 520 back to the comprehension interface 510.

Figure 6:
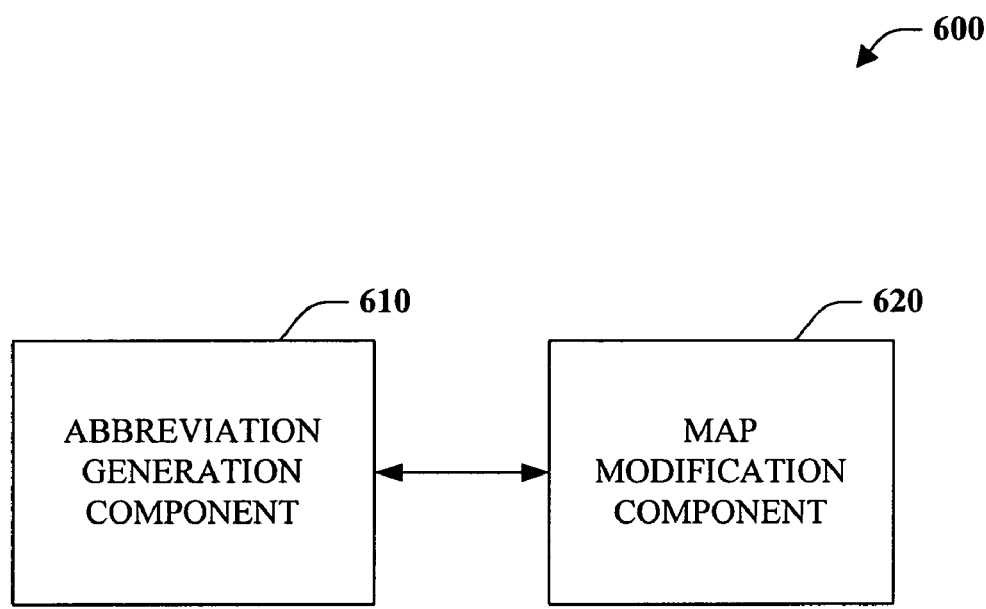
FIG. 6 is a block diagram of an abbreviation generation system.

Turning to FIG. 6 a custom abbreviation system 600 is provided in accordance with an aspect of the disclosed innovation. Although a system may include native abbreviations for queries or query comprehensions, it is also possible that a user may desire to create their own custom comprehension abbreviations utilizing system 600. System 600 includes an abbreviation generation component 610 and a map modification component 620. Abbreviation generation component 610 is a mechanism that facilitates specification of a custom abbreviation and the manner in which it maps to a query comprehension(s). For example, generation component 610 may include or interact with a graphical user interface (GUI) to aid in developing a custom abbreviation. Abbreviation generation component 610 can be communicatively coupled to map modification component 620. A map can define the mapping or correspondence between an abbreviation and one or more query comprehensions. The map can already include those mappings for native or system defined abbreviations. Abbreviation generation component 610 can transmit and map modification component 620 can receive a new mapping for a custom abbreviation. Map modification component 620 can then modify the abbreviation map or the like to include the new mapping. Thereafter, the custom abbreviation can be employed the same as native abbreviation to facilitate query specification.

The aforementioned systems have been described with respect to interaction between several components. It should be appreciated that such systems and components can include those components or sub-components specified therein, some of the specified components or sub-components, and/or additional components. For example, translation component 120 can include map component 210, type inference component 220, and optimization component 230 or some combination thereof. Additionally or alternatively, processor component 420 could include query component 110 and translation component 120. Sub-components could also be implemented as components communicatively coupled to other components rather than included within parent components. Further yet, one or more components and/or sub-components may be combined into a single component providing aggregate functionality. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, type inference component 220 can employ such methods or mechanism to infer types based on context.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers or other processor based devices. The term article of manufacture, as used, is intended to encompass a computer program accessible from any computer-readable device, carrier, or media.

Figure 7:
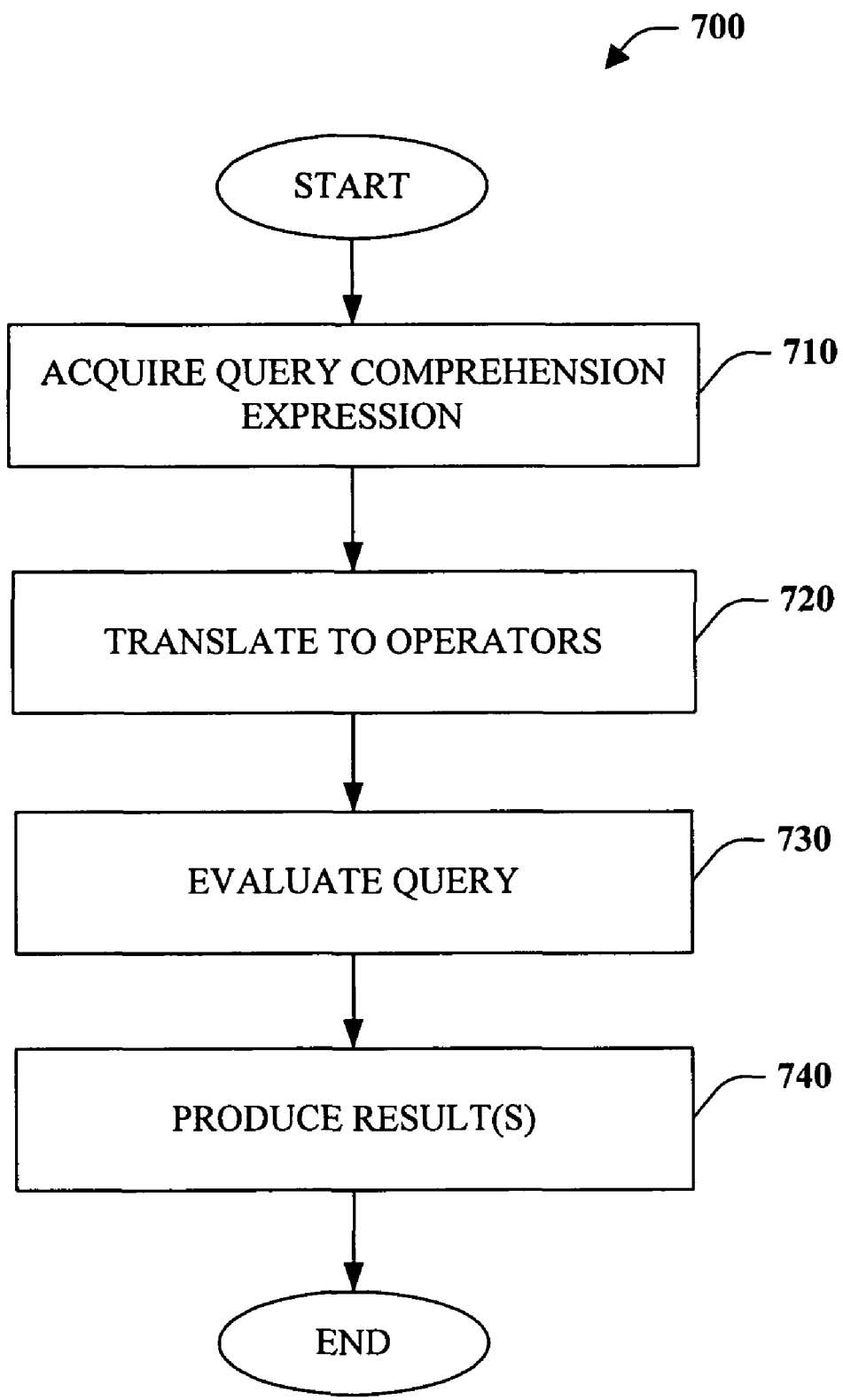
FIG. 7 is a flow chart diagram of a query processing methodology.

Turning to FIG. 7, a query processing methodology 700 is depicted in accordance with an aspect of the disclosed subject matter. At reference numeral 710, a query comprehension expression is acquired. A query comprehension can specify a query in a concise manner that is independent of a particular data type or shape on which actions are to be performed. Thus, there is a separation between the query and the data to be queried. At 720, the received query comprehension is translated to one or more operators. Operators such as sequence operators are more primitive methods that perform operations on arbitrary collections. The semantics of query comprehensions can be defined by translation into more primitive operators. The underlying operators are bound to whatever operators are in scope. Once translated from a query comprehension to operator(s), the query can be evaluated at 730. Evaluation can include manipulation and/or retrieval of data. The query can be evaluated by executing the operator(s) on one or more collections of data. At 740, results can be produced or returned, where applicable.

Figure 8:
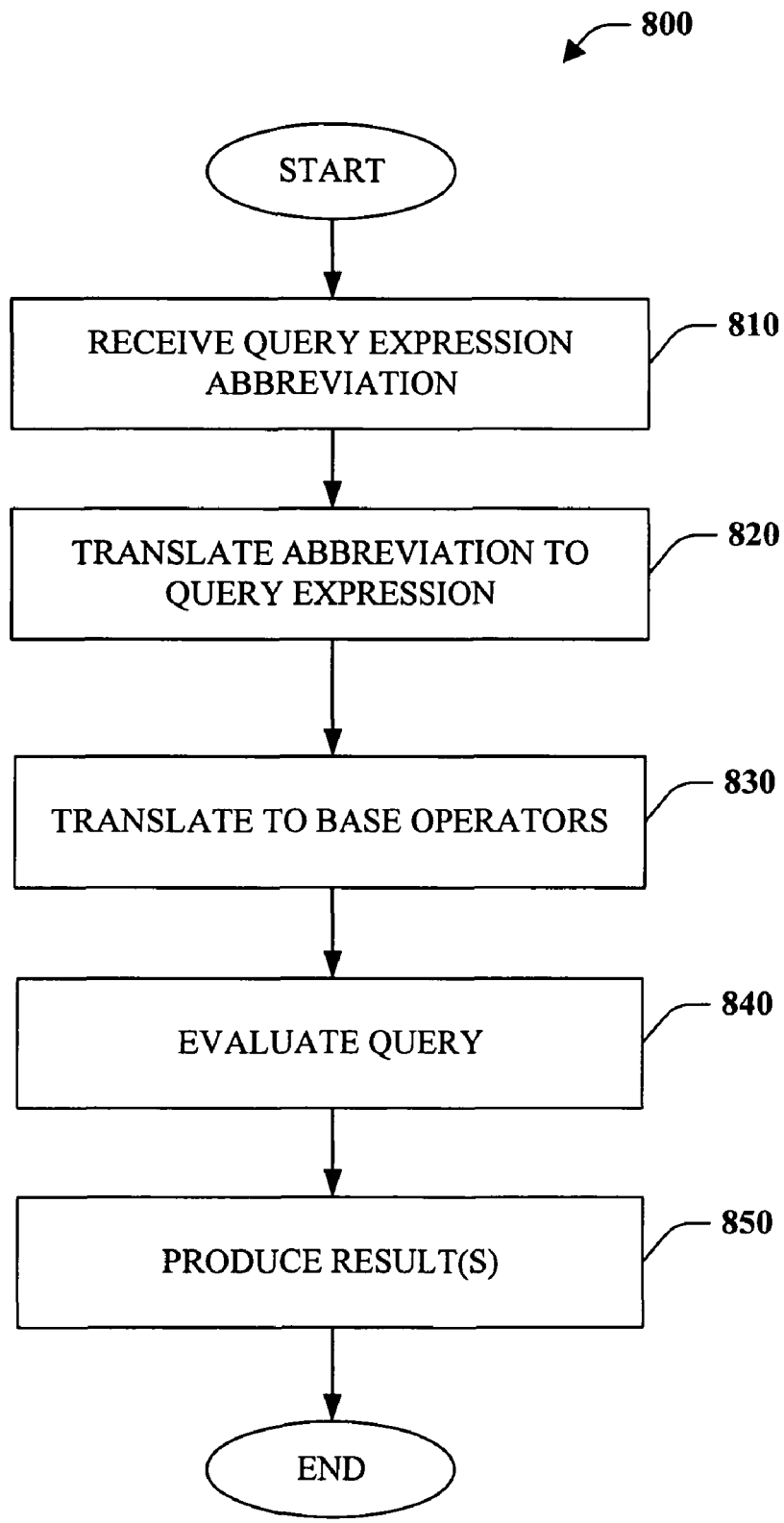
FIG. 8 is a flow chart diagram of a query processing methodology.

FIG. 8 is illustrates a method 800 of processing queries in accordance with an aspect of the subject innovation. At reference numeral 810, a query expression abbreviation is received such as query comprehension abbreviation. This expression can provide a short hand for query specification. For example, types and/or elements can be omitted or replaced by syntax that is more concise. At 820, the abbreviation is translated or expanded to a full query expression or comprehension. Stated differently, the abbreviation(s) are removed from the expression. At reference numeral 830, the query comprehension is translated to one or more base or sequence operators. These operators provide a mechanism for low level or primitive interaction with collections. Thus, a high-level query is transformed or mapped to low-level operators. At 840, the operators are employed to evaluate the query. Evaluation can involve filtering, computing and/or otherwise interacting with data as specified by the query operators. At 850, results of the evaluation are produced where applicable.

Figure 9:
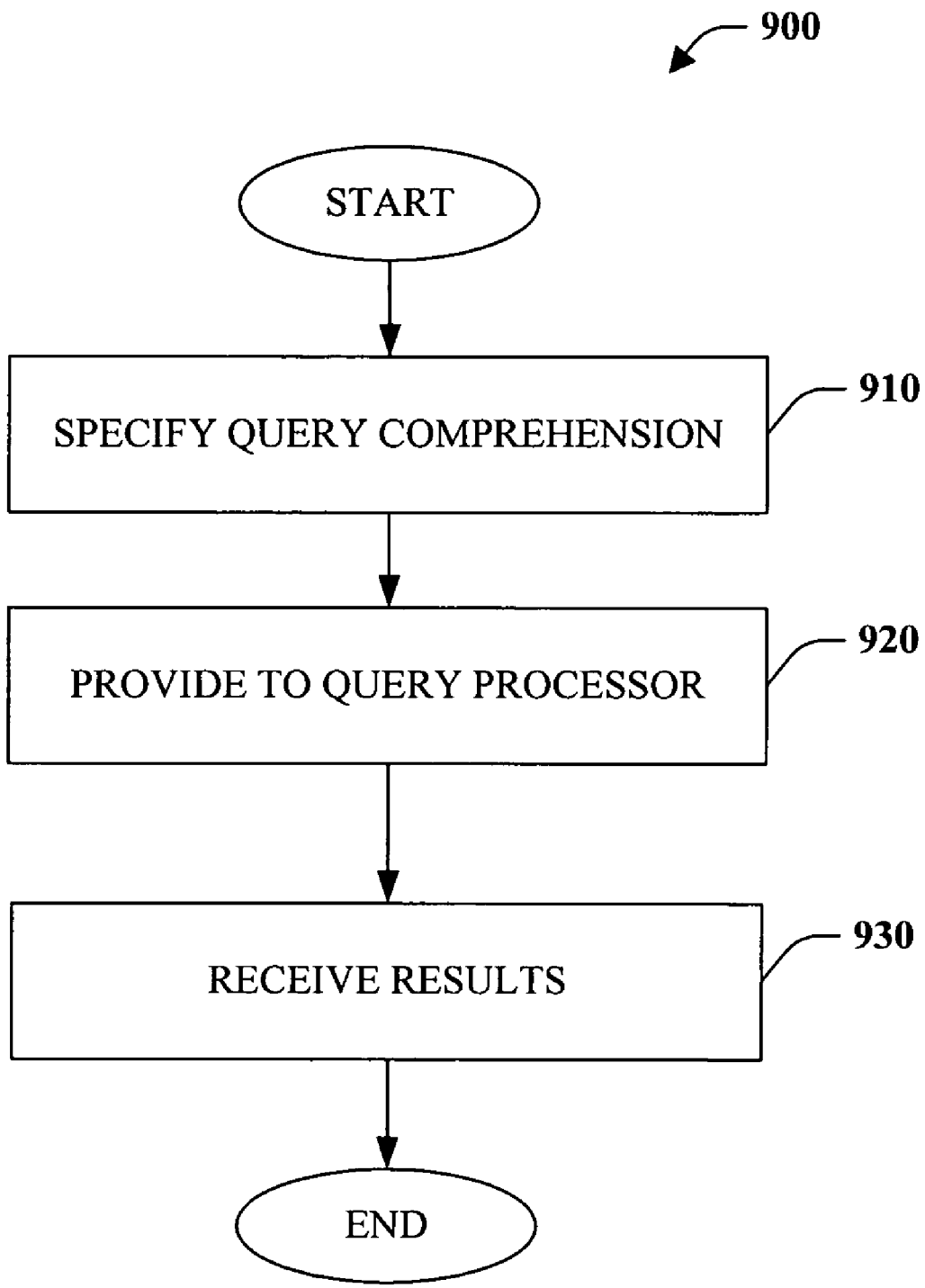
FIG. 9 is a flow chart diagram of a method of query processor interaction.

FIG. 9 depicts a method 900 of query processor interaction. At reference numeral 910, a query comprehension and/or abbreviation thereof can be specified. A query comprehension as described throughout is a concise or shorthand query expression that is independent of type, form or shape of data. Query comprehensions can be specified with respect to one or more generic or arbitrary collections. At numeral 920, the query comprehension is provided to a processor. The processor can then evaluate the query for example by translating the query comprehension to one or more operators. The operators can be specific to data types, forms or shapes. Accordingly, a query can be specified and executed over numerous data types depending on which operator implementation is bound to the comprehension. At 930, results of the query evaluation are received. This can happen when the query seeks to filter data or compute values, among other things.

Figure 10:
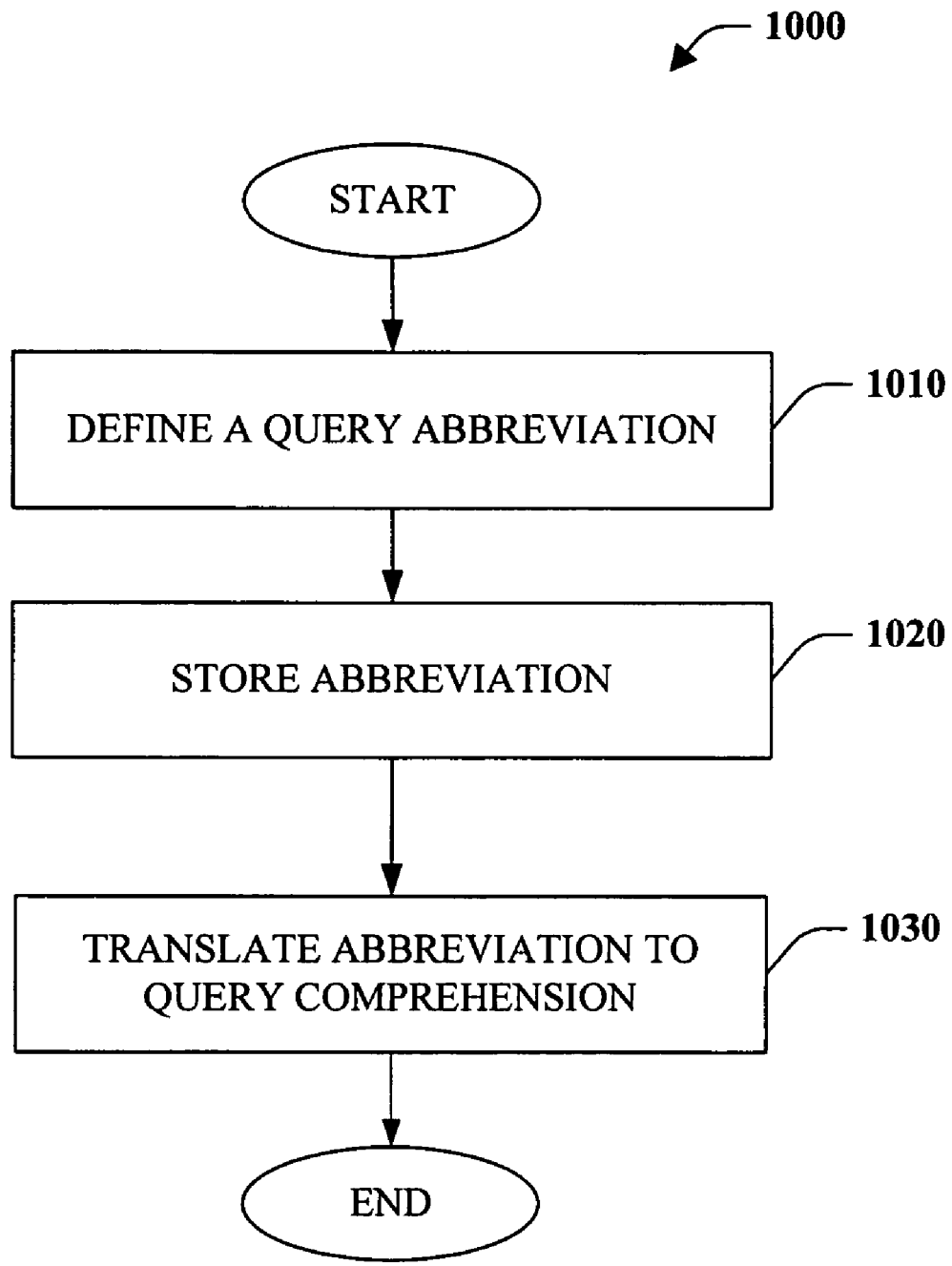
FIG. 10 is a flow chart diagram of an abbreviation generation methodology.

FIG. 10 illustrates a custom abbreviation methodology 1000 in accordance with an aspect of the disclosed subject matter. At reference 1010, a custom query abbreviation is defined. For example, the abbreviation can correspond to shorthand for a query comprehension. Accordingly, definition can also require providing a map or mapping of information pertaining to corresponding query comprehensions or elements thereof. At numeral 1020, the abbreviation is stored. More specifically a mapping can be persisted to facilitate translation from the abbreviation to a full query comprehension. Alternatively, it can be said that the mapping simply eliminates the abbreviation. Finally, at 1030, a received custom abbreviation can be translated to the query comprehension.

Figure 11:
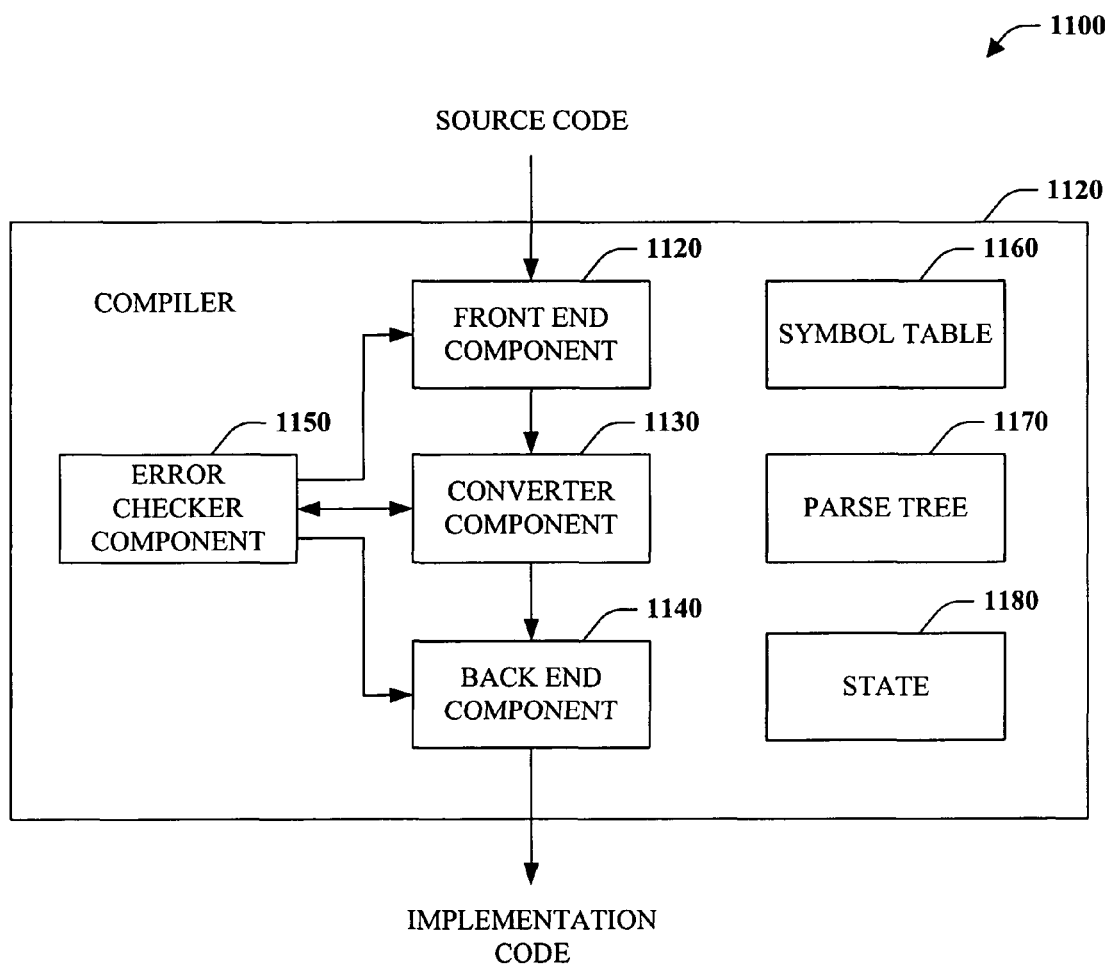
FIG. 11 is a schematic block diagram of a compilation environment.

FIG. 11 is a block diagram depicting a compiler environment 1100 that can be utilized to generate implementation code (e.g., executable, intermediate language . . . ). However, aspects of the environment could also be employed by a background compiler, for instance related to a code editor, to enable intelligent or context sensitive programming assistance to be provided. The compiler environment 1100 includes a compiler 1120 including front-end component 1120, converter component 1130, back-end component 1140, error checker component 1150, symbol table 1160, parse tree 1170, and state 1180. The compiler 1120 accepts source code as input and produces implementation code as output. The input can include but is not limited to query expressions or elements capable of being identified by query expressions including but not limited to query comprehensions and abbreviations as described herein. The relationships amongst the components and modules of the compiler environment 1100 illustrate the main flow of data. Other components and relationships are not illustrated for the sake of clarity and simplicity. Depending on implementation, components can be added, omitted, split into multiple modules, combined with other modules, and/or other configurations of modules.

Compiler 1120 can accept as input a file having source code associated with processing of a sequence of elements. The source code may include query comprehensions and abbreviations, other expressions, associated functions, methods and/or other programmatic constructs. Compiler 1120 may process source code in conjunction with one or more components for analyzing constructs and generating or injecting code.

A front-end component 1120 reads and performs lexical analysis upon the source code. In essence, the front-end component 1120 reads and translates a sequence of characters (e.g., alphanumeric) in the source code into syntactic elements or tokens, indicating constants, identifiers, operator symbols, keywords, and punctuation among other things.

Converter component 1130 parses the tokens into an intermediate representation. For instance, the converter component 1130 can check syntax and group tokens into expressions or other syntactic structures, which in turn coalesce into statement trees. Conceptually, these trees form a parse tree 1170. Furthermore and as appropriate, the converter module 1130 can place entries into a symbol table 1130 that lists symbol names and type information used in the source code along with related characteristics.

A state 1180 can be employed to track the progress of the compiler 1120 in processing the received or retrieved source code and forming the parse tree 1170. For example, different state values indicate that the compiler 1120 is at the start of a class definition or functions, has just declared a class member, or has completed an expression. As the compiler progresses, it continually updates the state 1180. The compiler 1120 may partially or fully expose the state 1180 to an outside entity, which can then provide input to the compiler 1120.

Based upon constructs or other signals in the source code (or if the opportunity is otherwise recognized), the converter component 1130 or another component can inject code to facilitate efficient and proper execution. For example, code can be injected to expand a comprehension abbreviation or translate from a query comprehension to sequence operators. Rules coded into the converter component 1130 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1160 and the parse tree 1170, a back-end component 1140 can translate the intermediate representation into output code. The back-end component 1140 converts the intermediate representation into instructions executable in or by a target processor, into memory allocations for variables, and so forth. The output code can be executable by a real processor, but the invention also contemplates output code that is executable by a virtual processor.

Furthermore, the front-end component 1120 and the back end component 1140 can perform additional functions, such as code optimization, and can perform the described operations as a single phase or in multiple phases. Various other aspects of the components of compiler 1120 are conventional in nature and can be substituted with components performing equivalent functions. Additionally, at various stages during processing of the source code, an error checker component 1150 can check for errors such as errors in lexical structure, syntax errors, and even semantic errors. Upon detection error, checker component 1150 can halt compilation and generate a message indicative of the error.

Figure 12:
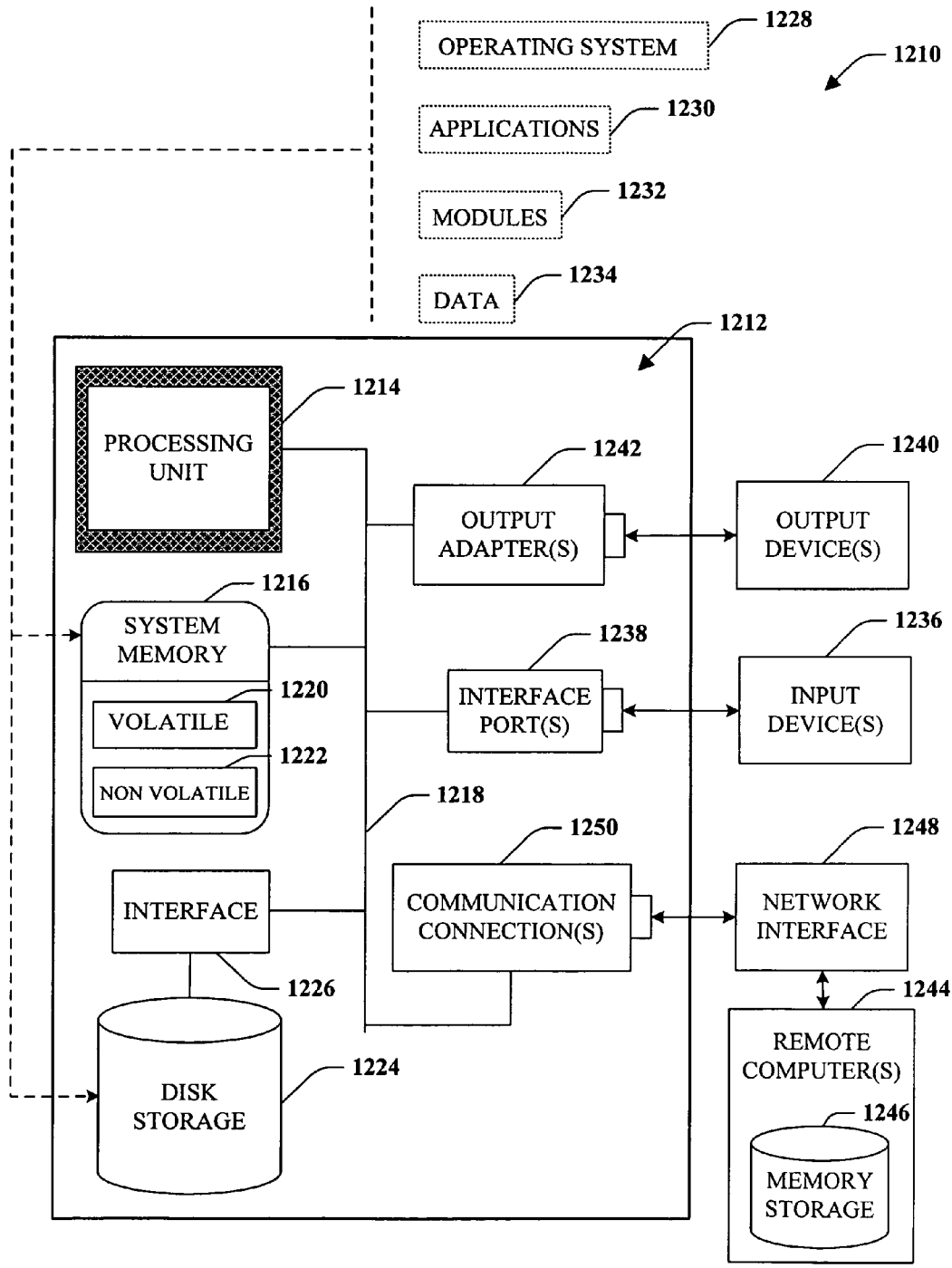
FIG. 12 is a schematic block diagram illustrating a suitable operating environment.
Figure 13:
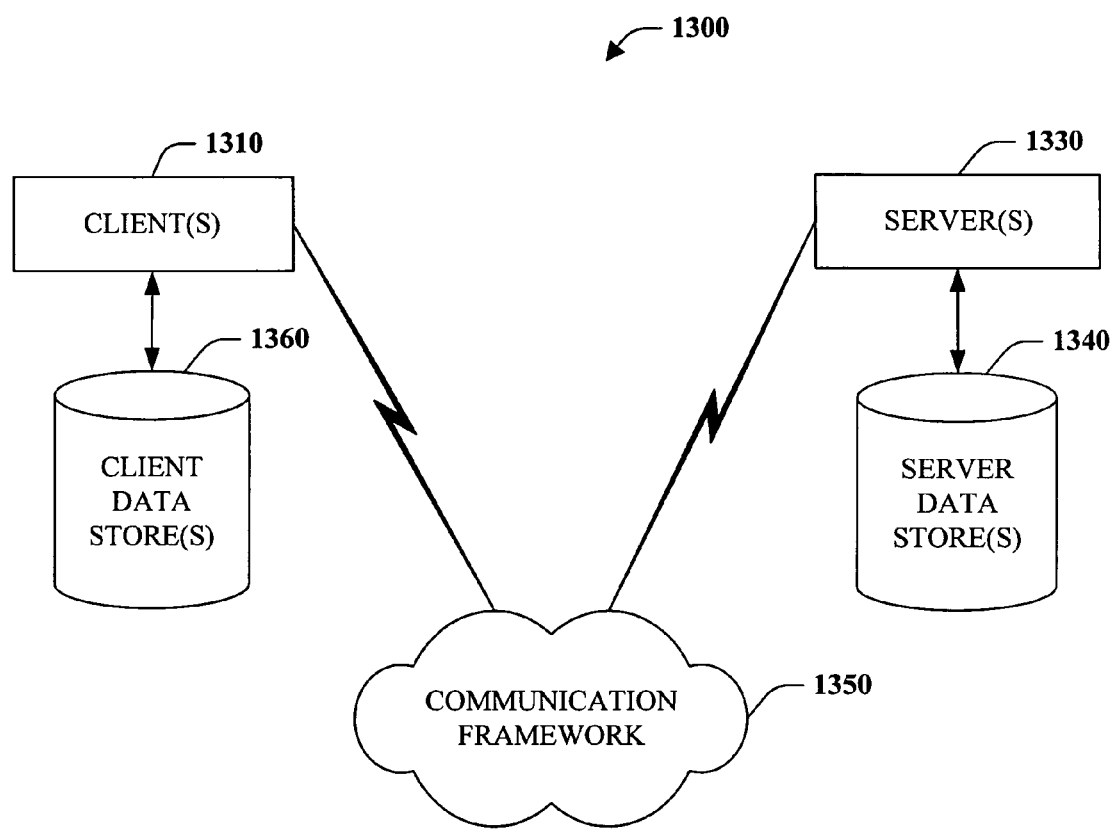
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A computer-implemented data query system comprising the following computer executable components:
    a processor communicatively coupled to a memory having stored thereon a query component that receives a query comprehension that provides a compositional mechanism for specifying expressions of queries, wherein the compositional mechanism enables individual sub-expressions of a particular query to be understood in isolation from other sub-expressions of the query, and wherein the compositional mechanism of the query comprehension specifies a query that is independent of language type, data type, and shape type on which actions are to be performed;
    a translation component that translates the query comprehension into a plurality of different sets of primitive operators, the different sets of primitive operators including sequence operators that provide operations including filtering, mapping, transforming, accumulation, and folding, the plurality of different sets of primitive operators including a first set of primitive operators configured for operations on a first language type, a first data type, and a first shape type, and a second set of primitive operators configured for operations on a second language type, a second data type, and a second shape type, wherein the second language type, data type, and shape type are different from the first language type, data type, and shape type, wherein the translation component includes an inference component that infers types associated with the query comprehension, the inference component including an artificial intelligence element that includes one or more of a support vector machine, a neural network, an expert system, a Bayesian belief network, fuzzy logic, data fusion engines, and classifiers;
    the processor executing the first set of primitive operators on a first data collection to evaluate data included in the first data collection in accordance with the query specified by the query comprehension;
    the processor executing the second set of primitive operators on a second data collection to evaluate data included in the second data collection in accordance with the query specified by the query comprehension; and
    a component for returning results of the evaluation of data included in the first collection and results of the evaluation of data included in the second collection.

2. The system of claim 1, wherein evaluation of the data from the first and second data collections comprises retrieving the data and/or manipulating the data.

3. The system of claim 2, the translation component includes a map component that maps query comprehension elements to the first set of primitive operators and to the second set of primitive operators.

4. The system of claim 2, the first and/or second data collections are one of relational and XML data or objects.

5. The system of claim 2, wherein the first data collection is a non-relational data collection, wherein the query comprehension is specified in a SQL style format and the processor component executes the first set of primitive operators on the first data collection.

6. The system of claim 1, further comprising an abbreviation component that receives an abbreviation and translates the abbreviation into a query comprehension.

7. The system of claim 6, further comprising a generation component that facilitates production of a user-defined abbreviation and a map component that persists mapping information with respect to the defined abbreviation and query comprehension elements.

8. The system of claim 6, the abbreviation denotes one or more of accumulation, aggregation, naming, grouping, ordering, mapping, flattening results, and a query fragment.

9. A computer-implemented query processing method comprising the following computer executable acts:
    acquiring a query comprehension that specifies a query over first and second generic collections of data wherein the query comprehension provides a compositional mechanism for specifying expressions of queries, wherein the compositional mechanism enables individual sub-expressions of a particular query to be understood in isolation from other sub-expressions of the query, and wherein the compositional mechanism of the query comprehension specifies a query that is independent of language type, data type, and shape type on which actions are to be performed;
    translating the query comprehension to a first set of one or more primitive operators configured for operations on a first language type, a first data type, and a first shape type and that are able to interact with the first generic collection of data, wherein the one or more primitive operators include sequence operators that provide operations including filtering, mapping, transforming, accumulation, and folding;
    translating the query comprehension to a second set of one or more primitive operators configured for operations on a second language type, a second data type, and a second shape type and that are able to interact with the second generic collection of data, wherein the second language type, data type and shape type are different from the first language type, data type and shape type, and wherein the translating is performed by a translation component that includes an inference component that infers types associated with the query comprehension, the inference component including an artificial intelligence element that includes one or more of a support vector machine, a neural network, an expert system, a Bayesian belief network, fuzzy logic, data fusion engines, and classifiers;

executing the first set of one or more primitive operators on the first generic collection of data to evaluate data included in the first generic collection of data in accordance with the query specified by the query comprehension;

executing the second set of one or more primitive operators on the second generic collection of data to evaluate data included in the second generic collection of data in accordance with the query specified by the query comprehension; and returning results of the evaluation of data included in the first collection and results of the evaluation included in the second collection for storage in system memory at a computer system.

10. The method of claim 9, wherein evaluation of the data from the first and second generic collections of data comprises retrieving the data and/or manipulating the data.

11. The method of claim 9, the first and/or second set of operators retrieve data from one of a relational and XML source and objects.

12. The method of claim 9, the first and/or second set of operators retrieve data from multiple sources.

13. The method of claim 9, further comprising:
acquiring a query abbreviation; and
translating the query abbreviation to a query comprehension.

14. The method of claim 13, further comprising receiving a user defined query abbreviation that maps to a query comprehension.

15. The method of claim 9, further comprising type checking a query comprehension when the type of the collection is denoted explicitly and/or inferred.

16. The method of claim 15, type checking comprises statically type checking a query comprehension.

* * * * *